United States Patent [19]

van den Berg et al.

[11] 4,157,298
[45] Jun. 5, 1979

[54] METHOD FOR THE REMOVAL OF FERRIC IONS FROM A CONCENTRATED AQUEOUS ZINC SOLUTION

[75] Inventors: Gerrit H. van den Berg, Amsterdam; Wilhelmus Pannekeet, Haarlem; Kees Koerts, Driebergen; Robert Smakman, Nigtevecht, all of Netherlands

[73] Assignee: Akzona Incorporated, Asheville, N.C.

[21] Appl. No.: 863,985

[22] Filed: Dec. 23, 1977

Related U.S. Application Data

[63] Continuation of Ser. No. 705,644, Jul. 15, 1976, abandoned.

[30] Foreign Application Priority Data

Jul. 18, 1975 [NL] Netherlands ............... 7508614

[51] Int. Cl.² ............................................. C02B 1/52
[52] U.S. Cl. .................................. 210/30 R; 210/38 B
[58] Field of Search ........... 75/101 BE; 210/24, 30 R, 210/38 B; 260/2.2 R, 2.2 C; 423/139

[56] References Cited

U.S. PATENT DOCUMENTS

| | | | |
|---|---|---|---|
| 3,004,932 | 10/1961 | Despic | 210/38 B |
| 3,352,801 | 11/1967 | White | 260/2.2 R |
| 3,715,339 | 2/1973 | Rainer | 260/2.2 R |

FOREIGN PATENT DOCUMENTS

906764 8/1972 Canada.

Primary Examiner—Charles N. Hart
Assistant Examiner—Ivars Cintins
Attorney, Agent, or Firm—Francis W. Young; Robert F. Green

[57] ABSTRACT

Ferric ions are removed from a concentrated aqueous zinc solution having a pH value in the range of about 0 to about 1.3, by contacting the zinc solution with a cation exchange chelate resin containing aminocarboxylic acid and/or iminodicarboxylic acid groups.

7 Claims, No Drawings

METHOD FOR THE REMOVAL OF FERRIC IONS FROM A CONCENTRATED AQUEOUS ZINC SOLUTION

This is a continuation of application Ser. No. 705,644, filed July 15, 1976, now abandoned.

BACKGROUND OF THE INVENTION

The present invention relates to a novel method for the removal of ferric ions from a concentrated aqueous zinc solution.

In the hydrometallurgical extraction of zinc from zinc ores, zinc concentrates and residues, zinc is obtained in the form of a concentrated aqueous solution. Depending on the quality of the ore and the pre-treatment used, however, the solution obtained not only contains zinc but also a considerable proportion of ferric ions, in addition to relatively small amounts of other metal ions, such as those of copper, cobalt, cadmium, arsenic and antimony. Iron, which is mainly present in the solution in the form of ferric ions, greatly interferes with the further treatment of the zinc and must therefore be removed.

In practice, iron has so far been removed by precipitation. Precipitation, however, is attended with a considerable loss of zinc, and the zinc-containing precipitate forms a waste problem because it does not readily lend itself to further treatment.

In Canadian Pat. No. 906,764, there is described a process for the purification of zinc solutions wherein a relatively weak zinc solution is freed from metal ions such as ferrous ions by contacting it with a solid cation exchanger which carries aminocarboxylic or iminocarboxylic acid groups, at a pH value between 2 and 4, and in the working examples between 3 and 3.9. It appears, however, that only the presence of iron as ferrous ions was considered, partly because at the aforementioned pH values, ferric ions would yield a precipitate of ferric hydroxide, which precipitate would seriously interfere with the ion exchange process. Another disadvantage of this known process is that the use of the aforesaid pH values will result in the exchange resin taking up considerable amounts of zinc ions, which upon elution will go into the eluate along with other metal ions present in the starting solution.

The present invention provides a method by which ferric ions are removed from a zinc solution by making use of an ion exchanging system in which the zinc is practically not bound at all on the ion exchanger. The resulting zinc solution is practically free from ferric ions and the zinc concentration is hardly decreased; zinc losses are practically nil. Another advantage consists in that the ion exchanger can be loaded to a high degree with ferric ions, so that in the elution process the iron can be obtained both pure and in concentrated form.

In accordance with the present invention, there is provided a process for the removal of ferric ions from a concentrated aqueous zinc solution, in which both zinc ions and ferric ions are present, and which zinc solution has a pH in the range of about 0 to about 1.3, and preferably between about 0.2 and about 1.1, which comprises contacting the zinc solution with a cation exchanger containing aminocarboxylic acid groups and/or iminodicarboxylic acid groups.

The above pH values correspond to values as measured with a pH meter provided with a glass electrode.

The zinc solutions to be treated in accordance with the invention may be, for example, solutions of zinc sulfate or chloride obtained by processing of zinc ores, or they may be for example solutions of zinc sulfate prepared for subsequent electrolytic zinc recovery, or they may be zinc solutions obtained in the acid treatment of scrap metal.

In practice, the zinc concentration in the aqueous solution to be treated, is generally of the order at at least 80 g/l, while that of ferric ions is as a rule between about 10 and about 30 g/l.

By reason of their ability to take up ferric ions, the ion exchange resins employed in accordance with the invention are referred to herein as a chelate resin.

The chelate resin used according to the invention substantially contains aminocarboxylic acid and/or iminodicarboxylic acid groups with 1 to 5 carbon atoms per carboxylic acid group (including the carbon atom belonging to the carboxyl group) and preferably an aminoacetic group and/or an iminodiacetic group. The ratio of the number of carboxyl groups to the number of nitrogen atoms of the above-mentioned nitrogen carboxylic acid groups in the chelate resin is generally between 0.8 and 2 and in practice as a rule between 1.2 and 1.7. The nitrogen content to be attributed to the above-mentioned nitrogen-carboxylic acid groups of the chelate resin is in general 2 to 6 and in practice as a rule 3 to 4 milliequivalents per gram of dry chelate resin in the acid state. In practice the loading capacity of chelate resin is between 1000 and 2000 meq of the above-mentioned weakly acid groups.

The chelate resin is known and can be prepared in the usual manner for instance by halo-alkylation of a matrix, followed by reaction with an aminocarboxylic acid or an iminodicarboxylic acid with 1 to 5 carbon atoms per carboxylic acid group (including the carbon atom belonging to the carboxyl group) or a derivative thereof such as a nitrile or an ester, in which latter case the reaction product is subjected to a hydrolysis. The chelate resin also can be prepared by reacting a halo-carboxylic acid containing 1 to 5 carbon atoms (including the carbon atom belonging to the carboxyl group) or a derivative thereof with a successively halo-alkylated and aminated matrix. Amination may be effected by means of for instance ammonia, ethylene diamine or polyamines, for example, tetraethylene pentamine. The matrix is obtained by suspension polymerization of one or more ethylenically unsaturated compounds, polymerization generally taking place at temperatures in the range of 10° to 160° C. and in the presence of a radical initiator, for instance azobisisobutyronitrile, benzoyl peroxide, lauryl peroxide and/or cumene hydroperoxide. To obtain a macroporous matrix the polymerization may be carried out, if desired, in the presence of one or more compounds that can precipitate and/or solvate the polymer to be prepared, for instance hexane, heptane, cyclohexane, amyl alcohol, cyclohexanol, benzene, toluene and/or chlorobenzene. Moreover, a linear polymer may have been dissolved in the monomer compound or compounds.

Suitable monomers that may be used for the preparation of the basic polymer are, for example, monovinyl aromatic compounds such as styrene, vinyl toluene, vinyl ethyl benzene, vinyl naphthalene and vinyl anisole or mixtures of these compounds. It is preferred that styrene be used. In the polymerization said monovinyl aromatic compound is generally employed in the presence of a cross-linking monomer in an amount of not more than 50% by weight, by preference between 3 and 18% by weight, based on the total amount of monomers. But the use of a cross-linking monomer is optional. As a cross-linking monomer there may be employed a compound with at least two ethylenically unsaturated groups, for instance ethylene glycol dimethacrylate or vinyl methacrylate, but preferably di- or polyvinyl aromatic compounds, such as divinyl ethyl benzene, trivinyl benzene and more particularly technical divinyl benzene are used. The preparation and the composition of the chelate resin to be used according to the invention is well known to those skilled in the art and need not be explained in further detail here.

According to the invention the chelate resin may partly or entirely be in the salt form, for instance as alkali metal salt, as zinc salt or as ammonium salt. But the resin also may be used in the acid form.

Experiments have shown that in the present separation of ferric ions from zinc ions other types of cation exchanges are not suitable. It has also been found that even if the solid cation exchanger with substantially aminocarboxylic acid groups and/or iminodicarboxylic acid groups (hereinafter referred to as chelate resin) is employed, application of the usual pH value between about 2 and about 5 will result in a relatively high proportion of zinc being taken up, so that the Zn:Fe ratio in the chelate resin is raised to an undesirable extent for this process. It is highly surprising that in the strongly acid medium of the present invention the chelate resin absorbs such a high amount of ferric ions from the zinc solution. For, normally, at this low pH a chelate resin shows a low loading capacity for heavy metals. Generally as cation exchanger a solid chelate resin is used, although it is also possible to use a liquid cation exchanger substantially containing aminocarboxylic acid and/or iminodicarboxylic acid groups.

Before the ferric and zinc ions-containing aqueous solution is contacted with the chelate resin, the measured pH of the solution is, according to the invention, brought to a value between 0 and 1.3, and preferably to a value between 0.2 and 1.1, in so far as the solution does not already have such a measured value. The process is preferably carried out in a sulphate medium, such as that obtained by treating zinc ores with sulphuric acid.

The temperature at which the chelate resin is loaded is generally in the range of 5° to 95° C. and preferably between 20° and 90° C. The chelate resin can be loaded upwardly or downwardly by using the well-known ion exchanging techniques, for instance by employing one or more columns connected in series. The resin bed may entirely or partly be fluidized. In order that the loading of the resin and the purity of the resulting zinc solution may be optimal, use is made of a number of columns connected by a so-called merry-go-round or torary system. Regeneration may take place in the same direction as or in a direction opposite to that of loading, and may be effected for instance by one of the above-mentioned techniques. Use may further be made of known techniques for reducing the dilution of product and/or eluate as may be realized for instance by systems in which the fluidized or non-fluidized resin and the liquid are fed in counterflow relation to each other.

After the chelate resin has been loaded to a desirable extent with ferric ions, it is eluted. This may be effected for instance by means of a solution of hydrochloric acid or sulphuric acid or with some other suitable elution agent. Elution is carried out at a temperature which is generally within the range of from 10° C. to the boiling temperature of the aqueous medium, and preferably between 10° and 30° C. In the elution of the chelate resin there is obtained a solution which mainly contains ferric salt and can be further processed in a simple manner. It is particularly preferred that the chelate resin be eluted with hydrochloric acid, so that the resulting ferric chloride solution can readily be processed into hydrochloric acid, which may be recirculated, and into ion oxide.

EXAMPLE

Into a column there was charged 1 liter of a chelate resin with a loading capacity of 2000 meq/liter of weakly acid groups, which resin had been obtained by chloromethylation of a macroporous copolymer consisting of 92% by weight of styrene and 8% by weight of divinyl benzene, followed by reaction with the diethyl ester of iminodiacetic acid and hydrolysis of the resulting product. The nitrogen content of the dry chelate resin was about $3\frac{1}{2}$ milliequivalents per gram.

Subsequently 2 liters of an aqueous solution containing 310 g/l zinc sulphate, 90 g/l of ferric sulphate and 20 g/l sulphuric acid and having a pH value of 0.7 measured with a pH meter with glass electrode were passed through the column over a period of 1 hour at a temperature of 80° C. After the column had been washed with de-mineralized water at a temperature of 80° C. until no more zinc could be detected in the effluent, the chelate resin was eluted for 1 hour with 2 liters of 10%-hydrochloric acid at a temperature of 20° C. It was found that the resin was loaded with 1470 meq/l ferric ions with as little as 1 meq/l of zinc ions.

When the above-described process was repeated in such a way that use was made of, respectively, a strongly acid cation exchanger with sulphonic acid groups (H-form; available under the trade name Imac C 12) and a weakly acid cation exchanger with carboxyl groups (acid form: available under the trade name Imac Z5), it was found that the ion exchanger was loaded with 145 meq/l ferric ions and 1385 meq/l zinc ions and with 188 meq/l ferric ions and 34 meq/l zinc ions, respectively.

What is claimed is:

1. A process for the removal of ferric ions from a concentrated aqueous solution containing zinc and ferric ions and having a pH value in the range of about 0 to 1.3, which comprises contacting said solution with a cation exchanger containing aminocarboxylic acid groups, iminodicarboxylic acid groups, or mixtures thereof, to remove ferric ions from the solution while removing substantially no zinc ions.

2. The process of claim 1 in which the pH value is between about 0.2 and about 1.1.

3. The process of claim 1 which said cation exchanger contains aminocarboxylic acid groups, iminodicarboxylic acid groups, or mixtures thereof, with 1 to 5 carbon atoms per carboxylic acid group, including the carbon atoms of the carboxyl group.

4. The process of claim 1 in which said cation exchanger is a solid.

5. The process of claim 1 in which said cation exchanger contains an aminoacetic acid group, an iminodiacetic acid group, or a mixture thereof.

6. The process of claim 1 in which said cation exchanger is in the form of an alkali metal or ammonium salt.

7. The process of claim 1 which includes the further step of recovering the ferric ions from the cation exchanger by elution.

* * * * *